United States Patent Office 2,789,932
Patented Apr. 23, 1957

2,789,932
HEAT RESISTANT TRANSPARENT LAMINATE

Luther L. Yaeger, Madison, Wis., assignor to Bjorksten Research Laboratories, Inc., a corporation of Illinois No Drawing. Application October 31, 1952,
Serial No. 318,071

1 Claim. (Cl. 154—2.75)

This invention relates to a laminate comprising substantially rigid transparent sheets having an interlayer laminated thereinbetween comprising the polymeric con-

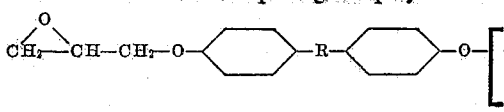

densation product of terephthalic acid and ethylene glycol.

Heretofore it has been the practice to laminate glass or acrylic resin sheets with an interlayer comprising a resin such as polyvinyl acetal, a cellulose ester, polyamides, and the like. Such laminates have several important disadvantages. They tend to degradate at high temperatures, to become inelastic at low temperatures and to be insufficiently transparent or to become insufficiently transparent after a period of time or after being subjected to temperature extremes.

Temperatures generated by air resistance in aircraft glazing members, such as windshields, during the operation of supersonic aircraft reach very high values and such members are also subjected to extremely low temperatures due to operation under arctic conditions and at extremely high altitudes. High temperatures are also attained in the windshields of aircraft which are heated to prevent the formation of ice thereon.

It is therefore desirable that transparent laminates retain certain physical properties at a temperature of 400° F. and that the resinous interlayer not become degraded by heating for as much as two hours at 400° F. The physical properties referred to include the property of the laminate to resist delamination when struck by a bullet, the property of the interlayer to "self-seal" or to substantially "self-seal" the hole left by a bullet passing through the laminate, a high degree of light transmission which should preferably be greater than 87% and at the same time a minimum of haze which should be less than 3%. An article is translucent which merely transmits a high percentage of light but at the same time is hazy and therefore it may be seen that the quality of transparency involves both the amount of light transmission and degree of haze. The same properties should be retained at temperatures down to and below —65° F.

It is therefore an object of this invention to provide a laminate interlayer having superior retention of desirable physical properties at extreme temperatures.

It is another object to provide a laminate having superior physical properties at extreme temperatures.

It is another object to provide such a laminate comprising glass or synthetic resin sheets having laminated thereinbetween an interlayer comprising a polyester synthetic resin.

Another object is a glass laminate provided with an interlayer comprising a polymer of ethylene glycol and terephthalic acid.

Further objects will become apparent from the following detailed description in which it is my intention to illustrate the applicability of the invention without limiting its scope to less than that of all equivalents.

In accordance with a preferred embodiment of the invention I prepare a thin sheet of oriented polymeric polyester reaction product produced by condensing a polycarboxylic acid such as terephthalic acid and a polyhydric alcohol such as ethylene glycol. I may laminate this sheet directly between sheets of substantially rigid transparent material such as glass or acrylic resin or I may first coat surfaces of such sheets with an epoxy resin and laminate the polyester sheet between such coated surfaces.

The following examples serve to illustrate the invention:

Example 1

A surface of each of two glass sheets was sprayed with a solution in methyl ethyl ketone of an epoxy resin having the following formula:

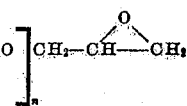

wherein R may be —O— or

where Y is $C_xH_{2x+1}$ and $x$ is 1 to 6 and

is bis-phenyl which may be halogen substituted, combined with an activator or catalyst. The methyl ethyl ketone was allowed to evaporate and a 0.002" thick sheet of polymeric terephthalic acid-ethylene glycol condensation product was placed between the glass sheets adjacent the sprayed surfaces. The resulting sandwich was laminated in a press at 250 p. s. i. and 400° F. for 30 minutes.

The shatter resistance of the resulting laminate at 400° F. and also at —65° F. when clamped in a test chamber pressurized with 6 p. s. i of air and fractured by bullet penetration was outstanding.

Example 2

A sandwich of glass plates and ethylene glycol-terephthalic acid polymer with an epoxy resin as an adhesive was prepared as in Example 1. The sandwich was cured between steel platens at 425° F. under 300 p. s. i. for 15 minutes; excessive adhesive flowed out of the laminates; when cool the following optical properties were obtained:

|  | Percent |
|---|---|
| Light transmission | 92.2 |
| Haze | 1.5 |

The laminate was reheated to 400° F. for two hours to simulate the effect of use as a windshield in fast-flying aircraft. The adhesive and interlayer did not discolor or delaminate and the optical properties after such treatment were found to be:

|  | Percent |
|---|---|
| Light transmission | 90.8 |
| Haze | 1.5 |

This laminate while at a temperature of 400° F. and also while at a temperature of —65° F. was clamped quickly into a window of an enclosed test chamber, 6 p. s. i. air pressure was applied to the chamber and the window was punctured by bullet penetration. No shattering of the laminate occurred at either temperature.

Example 3

The epoxy resin sold commercially as Epon RN-34, which has the following formula:

$$CH_2\overset{O}{-}CH-CH_2-O-\bigcirc-R-\bigcirc-O-\left[-CH_2-\underset{\underset{H}{O}}{CH}-CH_2-O-\bigcirc-R-\bigcirc-O\right]_n CH_2-CH\overset{O}{-}CH_2$$

wherein R may be —O— or $$-\underset{Y}{\overset{Y}{C}}-$$

where Y is $C_xH_{2x+1}$ and $x$ is 1 to 6 and $$-\bigcirc-$$

is bis-phenyl which may be halogen substituted, and has an average molecular weight of 469, was combined with a catalyst and used in place of the epoxy resin adhesive of example 1 and similar results were obtained. Triethylamine was used as the catalyst but other catalysts and activators known to the art, selected from the groups consisting of multicarboxylic acids and polyfunctional amines have been used and found suitable.

Example 4

The process of example 3 was repeated with a similar epoxy resin having an average molecular weight of approximately 355 sold commercially by Shell Development Company as Epon RN-48 and was also repeated with an epoxy resin having an average molecular weight of approximately 710 sold commercially by Shell Development Company as Epon RN-1064.

In both cases similar superior results were obtained.

Example 5

Laminates were prepared as in examples 1 to 5, using sheets of polymethylmethacrylate in place of glass. The resulting laminates exhibited differences in physical properties due to the use of polymethylmethacrylate rather than glass, but similar superior results were obtained with each of the laminates.

Example 6

A film of the polymeric condensation product of terephthalic acid and ethylene glycol .003" in thickness was laminated between two sheets of glass at a temperature of 375° F. and a pressure of 200 to 300 p. s. i. The glass sheets were cleaned prior to lamination but were not coated with any adhesive or bonding agent such as an epoxy resin, as was the case with the other laminates. The laminate thus produced resisted degradation of the interlayer and exhibited the same retention of transparency at high and low temperature extremes as was the case with the laminates of examples 1 to 5, but exhibited a substantially greater tendency to delaminate when struck by a bullet.

The conditions under which the laminate may be prepared are generally not critical. Generally the laminate may be made by heating at 100° C. to 130° C. for from 5 minutes to 45 hours at a pressure of from 2 to 10,000 p. s. i.

The superiority of the laminate produced in accordance with this invention may be observed from the following table which presents a comparison of a laminate produced according to this invention with laminates produced with interlayers of other polymeric materials. Laminates comprising films laminated between glass plates were checked for visual light transmission, heated for two hours in a ventilated oven at 400° F. and the optical properties were again measured.

INITIAL PROPERTIES

| Polyethylene glycol terephthalate (2 mil film) | Transparent Silicone Elastomer (25 mil film) | Polychlorotrifluoro ethylene (6 mil film) | Modified polyamide (7 mil film) | Cross-linked Polyvinyl butyral (25 mils) |
|---|---|---|---|---|
| [1] 92 [2] 1.5 | 85 16.8 | 91.5 2.1 | 91 2.3 | 90 3.1 |
| PROPERTIES AFTER 2 HRS. AT 400° F. | | | | |
| [1] 90 [2] 1.5 | 80 19.7 | 90.8 22.6 | | Opaque from bubble formation and brown discoloration. |

[1] Light transmission (percent).
[2] Haze (percent).

It will thus be seen that my invention is broad in scope and is not to be limited except by the claim.

I claim:

A transparent laminated safety glass article comprising two sheets of glass, a layer of the polymeric condensation product of terephthalic acid and ethylene glycol laminated therebetween, and as an adhesive between said layer and each of said sheets of glass, a layer of a resin having the following formula:

$$CH_2\overset{O}{-}CH-CH_2-O-\bigcirc-R-\bigcirc-O-\left[-CH_2-\underset{\underset{H}{O}}{CH}-CH_2-O-\bigcirc-R-\bigcirc-O\right]_n CH_2-CH\overset{O}{-}CH_2$$

wherein R may be —O— or $$-\underset{Y}{\overset{Y}{C}}-$$

where Y is $C_xH_{2x+1}$ and $x$ is 1 to 6 and $$-\bigcirc-$$

is bis-phenyl which may be halogen substituted.

References Cited in the file of this patent
UNITED STATES PATENTS

| | | |
|---|---|---|
| 1,899,588 | Rohlfs | Feb. 28, 1933 |
| 2,465,319 | Whinfield | Mar. 22, 1949 |
| 2,591,539 | Greenlee | Apr. 1, 1952 |
| 2,650,213 | Hofrichter | Aug. 25, 1953 |

OTHER REFERENCES

Araldite, Brit. Plastics, November 1948, pp. 521–525.

Epon Resins, Paint, Oil and Chem. Rev., November 9, 1950, vol. 113, issue No. 23, pp. 15, 18, 48, 49.

Epon Resins for Laminating, Technical Bulletin—S. C. 52-6 of Shell Chem. Corp., March 1952, p. 1.